(12) United States Patent
Chari et al.

(10) Patent No.: US 11,770,178 B2
(45) Date of Patent: *Sep. 26, 2023

(54) MULTI-CONSTELLATION SATELLITE TERMINAL

(71) Applicant: GOGO BUSINESS AVIATION LLC, Broomfield, CO (US)

(72) Inventors: Anand Chari, Naperville, IL (US); Yong Liu, Chicago, IL (US); Sean S. Cordone, Wheaton, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,605

(22) Filed: May 11, 2022

(65) Prior Publication Data

US 2022/0278743 A1 Sep. 1, 2022

Related U.S. Application Data

(63) Continuation of application No. 17/146,106, filed on Jan. 11, 2021, now Pat. No. 11,356,169, which is a
(Continued)

(51) Int. Cl.
*H04B 7/185* (2006.01)

(52) U.S. Cl.
CPC ..... *H04B 7/18504* (2013.01); *H04B 7/18508* (2013.01); *H04B 7/18513* (2013.01); *H04B 7/18526* (2013.01)

(58) Field of Classification Search
None
See application file for complete search history.

(56) References Cited

U.S. PATENT DOCUMENTS

| 5,936,588 A | 8/1999 | Rao et al. |
| 6,088,571 A | 7/2000 | Kane et al. |

(Continued)

FOREIGN PATENT DOCUMENTS

| EP | 2055020 B1 | 4/2017 |
| EP | 3404848 A1 | 11/2018 |
| WO | WO-2006/052941 A1 | 5/2006 |

OTHER PUBLICATIONS

U.S. Appl. No. 15/675,381, Opportunistic Balancing in Multiple Links, filed Aug. 11, 2017.
(Continued)

*Primary Examiner* — Suhail Khan
(74) *Attorney, Agent, or Firm* — MARSHALL, GERSTEIN & BORUN LLP

(57) ABSTRACT

A method of communicating with multiple satellites includes allocating, based on one or more conditions corresponding to a plurality of spatial channels associated with multiple satellites, each subset of a plurality of subsets of antenna resources of a phased array antenna to a respective different satellite included in the multiple satellites. The method also includes commanding one or more transceivers to establish simultaneous communicative connections to the different satellites via the allocated subsets of antenna resources, and re-allocating, based on a detected change to at least one of the one or more conditions, at least one antenna resource to a respective another different satellite. The method also includes commanding the one or more transceivers to maintain the simultaneous communicative connections to the different satellites using the re-allocated at least one antenna resource.

20 Claims, 4 Drawing Sheets

Related U.S. Application Data continuation of application No. 16/751,442, filed on Jan. 24, 2020, now Pat. No. 10,924,179, which is a continuation of application No. 16/272,458, filed on Feb. 11, 2019, now Pat. No. 10,574,337.

(56) References Cited

U.S. PATENT DOCUMENTS

| | | | |
|---|---|---|---|
| 7,167,704 | B2 | 1/2007 | Chang et al. |
| 7,505,736 | B2 | 3/2009 | Min |
| 7,920,860 | B2 | 4/2011 | Chari et al. |
| 9,553,657 | B2 | 1/2017 | Cordone |
| 9,572,080 | B1 | 2/2017 | Wang et al. |
| 9,591,462 | B2 | 3/2017 | Lauer et al. |
| 9,647,748 | B1 | 5/2017 | Mitchell |
| 10,014,930 | B2 | 7/2018 | Lauer |
| 10,158,420 | B1 | 12/2018 | Montsma et al. |
| 10,574,337 | B1 | 2/2020 | Chari et al. |
| 10,797,381 | B2 | 10/2020 | DiFonzo et al. |
| 10,924,179 | B2 | 2/2021 | Chari et al. |
| 2002/0081969 | A1 | 6/2002 | Chang et al. |
| 2009/0100476 | A1 | 4/2009 | Frisco et al. |
| 2011/0064060 | A1 | 3/2011 | Suga et al. |
| 2013/0321201 | A1 | 12/2013 | Savoy et al. |
| 2014/0136658 | A1 | 5/2014 | Wahler |
| 2015/0365870 | A1 | 12/2015 | Lauer |
| 2017/0034250 | A1* | 2/2017 | Sobhani ............. H04W 84/06 |
| 2018/0164441 | A1 | 6/2018 | Feria et al. |
| 2018/0337722 | A1 | 11/2018 | Paulsen et al. |

OTHER PUBLICATIONS

U.S. Appl. No. 15/844,055, Dynamic Load Balancing of Satellite Beams, filed Dec. 15, 2017.
International Application No. PCT/US2020/017577, International Search Report and Written Opinion, dated Jun. 5, 2020.
Office Actoin for U.S. Appl. No. 16/751,442, dated Mar. 3, 2020.
Office Action for U.S. Appl. No. 16/751,442, dated Jul. 29, 2020.
Arinc, "Second-Generation Ku-Band and Ka-Band Satellite Communication System", Arinc Characteristic 792, Dec. 2018, 147 pages.
Request for Ex Parte Reexamination of U.S. Pat. No. 10,574,337 filed on Jan. 18, 2022.
Request for Ex Parte Reexamination of U.S. Pat. No. 10,924,179 filed on Jan. 18, 2022.
Non-Final Office Action dated Jun. 8, 2022 in Ex Parte Reexamination of U.S. Pat. No. 10,574,337 (Control No. U.S. Appl. No. 90/014,947, filed Jan. 18, 2022).
Non-Final Office Action dated Jul. 7, 2022 in Ex Parte Reexamination of U.S. Pat. No. 10,924,179 (Control No. U.S. Appl. No. 90/014,946, filed Jan. 18, 2022).
Final Office Action dated Sep. 20, 2022 in Ex Parte Reexamination of U.S. Pat. No. 10,574,337 (Control No. U.S. Appl. No. 90/014,947, filed Jan. 18, 2022).
Advisory Action dated Dec. 8, 2022 in Ex Parte Reexamination of U.S. Pat. No. 10,574,337 (Control No. U.S. Appl. No. 90/014,947, filed Jan. 18, 2022).
Final Office Action dated Oct. 28, 2022 in Ex Parte Reexamination of U.S. Pat. No. 10,924,179 (Control No. U.S. Appl. No. 90/014,946, filed Jan. 18, 2022).

* cited by examiner

MULTI-CONSTELLATION SATELLITE TERMINAL

CROSS-REFERENCE TO RELATED APPLICATIONS

The present application is a continuation of U.S. patent application Ser. No. 17/146,106, entitled "MULTI-CONSTELLATION SATELLITE TERMINAL," filed on Jan. 11, 2021, which is a continuation of U.S. patent application Ser. No. 16/751,442, entitled "MULTI-CONSTELLATION SATELLITE TERMINAL," filed on Jan. 24, 2020, which is a continuation of U.S. patent application Ser. No. 16/272,458, entitled "MULTI-CONSTELLATION SATELLITE TERMINAL," filed on Feb. 11, 2019 and issued as U.S. Pat. No. 10,574,337. The entire disclosure of each of the above-identified applications is hereby incorporated herein by reference.

FIELD OF THE INVENTION

The following disclosure generally relates to systems and methods for utilizing the resources of a single antenna array or platform disposed on-board a vehicle to establish multiple communications links between the vehicle and multiple constellations of satellites, for example, simultaneously over a particular interval of time while the vehicle is in transit or in motion.

BACKGROUND

It is of utmost importance for people and systems on-board an in-flight aircraft to be able to communicate with people and communications networks and/or systems on the ground. Communications links supporting such communications may be implemented via a direct link between an aircraft and a ground station (e.g., "air-to-ground" communications links), and/or may be implemented via a set of intermediate links, e.g., a direct link between an aircraft and a satellite, and another direct link between the satellite and a satellite ground station or earth station, where the satellite ground station may be communicatively connected with other ground-based communications and/or data networks. Information such as location, weather forecast, air traffic, satellite fidelity updates, etc. may be communicated between the ground and in-flight aircraft to ensure safe and efficient travel, for example.

Since the advent of personal electronic devices (PEDs) such as laptops, tablet computers, smartphones, personal digital assistants, e-readers, smart devices, and other types of mobile computing devices, in-flight passengers have been allowed to use their personal electronic devices during flight to access communications links to thereby communicate with ground stations and systems that give the passengers access to the internet and/or other ground-based data and communications networks. Generally, such passenger services are referred to as "passenger in-flight connectivity services," or generally "on-board connectivity services." However, an aircraft's capacity to support on-board connectivity services is significantly constrained in comparison with the capacity of terrestrial connectivity services (e.g., when a person utilizes his or her PED on the ground or terrestrially), especially as aircrafts are increasingly able to transport greater numbers of passengers, each of whom may desire to utilized his or her PED on-board. An aircraft may provide passenger on-board connectivity services via direct air-to-ground communications links and/or via satellite links, but each of such on-board communications technologies typically only supports a single air interface standard over a given physical channel. In addition, coverage is not globally available using any one given on-board communications technology. All of these factors, and/or other factors, may result in lagging network performance and unnecessary on-board connectivity outages.

SUMMARY OF THE DISCLOSURE

In an embodiment, a method of communicating with multiple satellites includes allocating, by a controller of a mobile communicator mounted on a mobile platform and based on one or more conditions corresponding to a plurality of spatial channels associated with multiple satellites, each subset of a plurality of subsets of antenna resources of a phased array antenna to a respective different satellite included in the multiple satellites. The method also includes commanding, by the controller, one or more transceivers to establish simultaneous communicative connections to the different satellites via the allocated subsets of antenna resources, and re-allocating, by the controller based on a detected change to at least one of the one or more conditions, at least one antenna resource included in the plurality of subsets of antenna resources of the phased array antenna to a respective another different satellite. The method also includes commanding, by the controller, the one or more transceivers to maintain the simultaneous communicative connections to the different satellites using the re-allocated at least one antenna resource.

In an embodiment, a mobile communicator, mounted on a mobile platform, for communicating with multiple satellites includes a phased array antenna that is configured to propagate electromagnetic signals from the mobile communicator towards satellites via a plurality of antenna resources, one or more transceivers configured to communicate data that is to be delivered between the mobile platform and satellites, and a controller executing computer-executable instructions stored on one or more tangible-non-transitory memories to: (1) allocate, based on one or more conditions corresponding to a plurality of spatial channels associated with multiple satellites, each subset of a plurality of subsets of antenna resources of the phased array antenna to a respective different satellite included in the multiple satellites; (2) command the one or more transceivers to establish simultaneous communicative connections to the different satellites via the allocated subsets of antenna resources; (3) re-allocate, based on a detected change to at least one of the one or more conditions, at least one antenna resource included in the plurality of subsets of antenna resources of the phased array antenna to a respective another different satellite; and (4) command the one or more transceivers to maintain the simultaneous communicative connections to the different satellites using the re-allocated at least one antenna resource.

DETAILED DESCRIPTION

Figure 1:
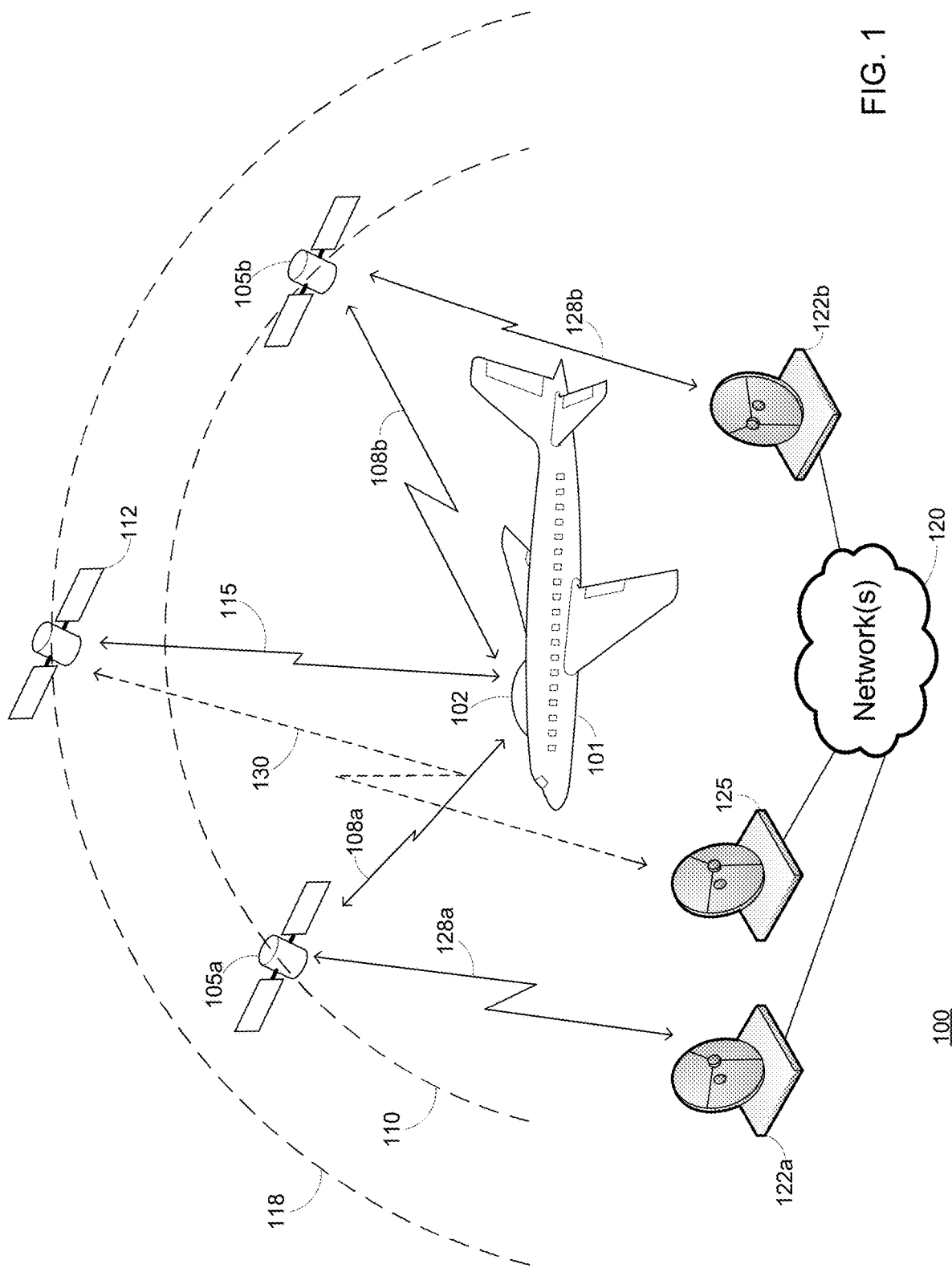
FIG. 1 depicts an example scenario of a vehicle utilizing an on-board multi-constellation terminal or communicator, e.g., to support on-board connectivity services.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Conventionally, vehicles that are in transit or in motion may engage in bidirectional communications with a ground communication system (e.g., via satellite networks and/or direct, wireless vehicle-to-ground networks, such as air-to-ground networks) to transmit and receive media content, flight information, passenger data and/or communications, safety information, vehicle location, satellite map information, weather forecast, air traffic, satellite fidelity updates, and/or other data. An in-flight aircraft, for example, may receive a transmission via a receive (RX) spatial channel established by a phased array antenna (e.g., an active electronically scanned phased array antenna) mounted to the aircraft, and may further send a transmission via a transmit (TX) spatial channel established by the same antenna. Typically, direct vehicle-to-ground connectivity may not be consistently available, e.g., such as when an aircraft passes over rural areas or the ocean. Satellite links and systems may be used to provide communicative connectivity with vehicles when direct vehicle-to-ground communications are not available, and/or otherwise when desired.

Communication systems that provide connectivity with vehicles via satellite links may be complex, as each satellite network may include tens or hundreds of satellite beams supplied by multiple communication satellites. Due in part to the long distances between the vehicles and the satellites, it is important that antenna systems that are on-board vehicles are able to be accurately steered, pointed, and/or tracked towards target satellites in a consistent manner. Additionally, when both the source and the destination of an in-flight transmission is moving, taking active steps to maintain accurate pointing and tracking of both TX and RX spatial channels becomes particularly important.

For ease of reading, and not for limitation purposes, the term "in-flight aircraft" is used herein to refer to an in-transit vehicle, but it is understood that the novel techniques described herein are applicable to any type of in-transit vehicle such as a ship, boat, yacht, submarine, automobile, truck, motorcycle, car, bus, military vehicle, or other vehicle capable of moving along the air, land, sea, or space. Further, the term "aircraft," as utilized herein, may encompass airplanes, helicopters, balloons, drones, jets, gliders, airships, aerostats, aerodynes, or any other type of vehicle that is capable of moving along the air. Still further, the term "antenna platform" is used interchangeably herein to refer to any antenna(e) array, antenna(e) system, or antenna(e) device which may be installed on a vehicle and employed to transmit and receive wireless signals to/from satellites by propagating electromagnetic waves directed towards satellites and by being excited by electromagnetic waves that have been propagated by satellites. For example, an antenna platform may consist of a single, phased array antenna.

At any rate, an antenna platform may be disposed on-board a particular in-flight aircraft and may be used to establish and utilize a satellite communications link to deliver data corresponding to and otherwise support on-board connectivity services. At some point during the trajectory of the particular in-flight aircraft, an active communications link to a particular satellite that is currently being used for on-board connectivity services may become sub-optimal (e.g., due to weather or atmospheric interference, scheduled satellite maintenance, the aircraft moving out of the particular satellite's coverage region, etc.), and another communications link to a different satellite may be established to handle on-board connectivity services in lieu of the sub-optimal satellite link. A satellite link being optimal or sub-optimal may be determined by, for example, and without limitation, satellite link signal strength, satellite link available bandwidth, other quality of service characteristics, coverage area of the satellite link, the direction of the satellite's trajectory relative to the trajectory of the in-flight aircraft, as well as other factors. A hard handoff (e.g., a "break then make" handoff technique) of a communications link from one satellite to another satellite by the on-board antenna platform may cause down time or otherwise interrupt on-board connectivity services, which may result in lagging transfer of data, delayed delivery, or even omission of delivery of important information to and/or from the aircraft.

Known techniques for mitigating the undesirable effects of hard handoff include, for example, installing two separate, physical antenna platforms on-board an aircraft, both of which are configured to communicate with a particular constellation of satellites using the prescribed air interface standard of the constellation. As such, while one antenna platform services on-board connectivity services via a first physical channel to a first satellite of the constellation, the other antenna platform is utilized to establish a subsequent physical channel to a second satellite of the constellation for use in performing a "soft" or "semi-soft" handoff (also commonly referred to as a "make then break" technique, e.g., in which duplicate streams of data are delivered over both physical channels for some interval of time prior to the data stream being handled solely by the subsequent physical channel). However, such known techniques add significant undesirable weight to an in-flight aircraft as well as add multiple points of failure, as two separate, physical antenna platforms are required. Further, as the two antenna platforms are capable of communicating with only a particular satellite constellation or system that operates in a particular satellite frequency band (e.g., one of the L, S, C, X, Ku, K, or Ka bands, or another band that is utilized for satellite communications), bandwidth that is available for on-board connectivity services is limited by the bandwidth of the frequency band and the air interface that is utilized by the particular satellite system and for which the antenna platforms are specifically configured.

The novel and inventive techniques disclosed herein for providing continuous on-board connectivity service to in-flight passengers address these and other issues of known systems. In an embodiment, a multi-constellation satellite terminal (which is interchangeably referred to herein as a "multi-constellation satellite communicator") is mounted on or otherwise disposed on-board an aircraft and is utilized to support on-board connectivity services of the aircraft, e.g., while the aircraft is in flight and/or at other times. The multi-constellation satellite terminal includes a single antenna platform or array that may be configured and used to establish respective communicative connections to multiple satellites over which data payload and other data corresponding to on-board connectivity services is delivered, e.g., bi-directionally. Significantly, the multiple satellites may be disposed in different satellite constellations and/or may utilize different air interface standards. Further, the multiple communicative connections with the multiple satellites supported by the single antenna platform or array may be simultaneously maintained and/or operational over various intervals of time. It is noted that although the satellite terminal or communicator is referred to herein as being "multi-constellation," the multi-constellation satellite terminal/communicator is not limited to only being utilized for communicating with satellites disposed in multiple, different constellations, as the multi-constellation satellite terminal/communicator may additionally or alternatively be utilized to communicate with different satellites of a same satellite constellation.

Typically, the multi-constellation satellite terminal includes or utilizes only one antenna platform or array (and not more than one antenna platform or array) to communicatively connect with multiple satellite constellations to support on-board connectivity services. As such, multiple spatial channels to different satellites may be established, supported, and maintained (in some scenarios, simultaneously) by a single physical antenna architecture. For example, the single antenna platform or array may establish and maintain satellite connectivity to multiple satellites by utilizing different subsets or portions of its resources (which may be mutually exclusive subsets or portions) to respectively support different spatial channels to different satellites, where the different spatial channels correspond to different air interfaces. Further, as conditions related to the spatial channels and/or to the aircraft change, the single antenna platform or array of the multi-constellation satellite terminal may be adapt the single antenna platform or array, as well as other components, to drop, establish, support and/or maintain various spatial channels to multiple satellites in multiple constellations to thereby maintain optimal support for on-board connectivity services.

In an example usage of the multi-constellation satellite terminal, a portion or subset of the antenna resources provided by the single antenna platform or array may be utilized to establish and maintain an active communications link between the aircraft and a particular satellite via a first spatial channel to support on-board connectivity services, while other antenna resources provided by the same antenna platform may be utilized to probe other channels to other satellites to find a subsequent link that may be utilized in lieu of the current active communications link (e.g., due to the travel trajectory of the aircraft, due to changes in the quality of service of the active communications link, etc.). As previously mentioned, the other satellites may or may not be included in the constellation in which the particular satellite is included. Additionally or alternatively, the other satellites may or may not utilize the particular frequency band, air interface, and/or protocol via which the particular satellite utilizes for communications. At any rate, upon the identification of a subsequent link based on the probing and/or based on other factors or conditions, the subsequent link may be established via the single antenna platform using another portion of its antenna resources, and a soft or semi-soft handoff may be performed by the multi-constellation satellite terminal to switch the satellite link that is being utilized for on-board connectivity from the active link to the subsequent link and its respective spatial channel. By utilizing respective antenna resources of a single, physical antenna platform or array for performing soft handoff, the down time of on-board connectivity services due to a handoff from the active satellite link to the more optimal satellite link may be reduced, if not eliminated, without having to install, utilize, support, and transport the weight of two separate antenna platforms on-board the vehicle.

In another example usage of the multi-constellation satellite terminal, a first portion of the antenna resources provided by the single antenna platform or array may be utilized to establish and maintain an active communications link between the aircraft and a particular satellite via a first spatial channel to support on-board connectivity services, while other antenna resources provided by the same antenna platform may be utilized to probe channels to other satellites to find one or more additional, suitable communications links to provide additional support for on-board connectivity services. Again, the other satellites may or may not be included in the constellation in which the particular satellite is included, and/or the other satellites may or may not utilize the particular frequency band, air interface, and/or protocol via which the particular satellite utilizes for communications. At any rate, based on the probing and/or based on additional factors or conditions, an additional, second communications link may be identified and established using a second portion of the resources provided by the single antenna platform via a second spatial channel. Both established, active communications links (e.g., the link established via the first portion of the antenna resources and the link established via the second portion of the antenna resources) may be simultaneously utilized to support on-board connectivity services over an interval of time, thereby providing the aircraft with increased data bandwidth for on-board connectivity services during the interval of time. For example, during the interval of time, different data streams corresponding to on-board connectivity services may be delivered via the respective spatial channels of the two active communications links established via the single antenna platform. If desired, a third set of antenna resources provided by the single antenna platform may be utilized to probe other satellites for other suitable links, and the multi-constellation satellite terminal may establish and maintain one or more additional active communications links (e.g., via one or more other spatial channels) based on the probing and/or based on other factors or conditions, e.g., in a manner such as described above.

As previously discussed, the multi-constellation satellite terminal may establish and maintain multiple communicative connections or links with satellites of different satellite systems that utilize different orbits, which may provide corresponding benefits and advantages that are not realized by using known techniques. For example, an aircraft may benefit from using, for the purposes of on-board connectivity services, a low-earth orbit (LEO) satellite link while maintaining a longer distance link with a geosynchronous-earth orbit (GEO) satellite because, as is commonly understood, GEO links are more reliable globally as compared to LEO links. Thus, to reduce or eliminate down-time of on-board connectivity services while handing off between LEO links, an on-board antenna platform may establish and/or utilize a GEO link to support on-board connectivity services in conjunction with the LEO links, e.g., simultaneously, or over a common interval of time. However, for typical, on-going support of on-board connectivity services, the on-board antenna platform may generally prefer to use LEO links over GEO links due to the longer latency of GEO links.

In another example, adjacent satellite interference (ASI) of two geographically overlapping LEO satellite beams may cause an LEO link to become sub-optimal. As such, the on-board antenna platform may establish (e.g., a priori and/or as needed) links to other satellites of other satellite systems that are disposed in other orbits, that utilize different frequency bands, that utilize different air interfaces, that utilize different protocols, and/or that utilize other spatial channels, instead of or in addition to other LEO link(s). The non-LEO links may serve as back-up links (which may be implemented as "hot" back-up links) when LEO link degradation occurs. Each of the links to various satellites of the different satellite systems (e.g., LEO, GEO, medium earth orbit (MEO), highly elliptical orbit, polar orbit, etc.) may be established via the single antenna platform or array included in the multi-constellation satellite terminal on-board the aircraft, e.g., via respective subsets of antenna resources provided by the single antenna platform or array, for example.

Indeed, for a given vehicle travel trajectory, optimal communicative connectivity between the aircraft and various satellite systems may be established and maintained by using any number of communications links between the aircraft and satellites in the same or different orbits, and by dynamically establishing additional links, dropping currently active links, and/or performing handoffs using any number of communications links between the aircraft and satellites in the same or different orbits, e.g., in accordance with changing conditions. Generally speaking, the communications links that are able to be established and maintained (in some situations, simultaneously) by the single antenna platform may include links that are supported by various frequency bands that are utilized for satellite and other types of wireless communications, such as the L, S, C, X, Ku, K, Ka, 2.4 GHz, 5 GHz, 800 MHz, and/or any other suitable bands, including those described elsewhere in the present disclosure. Similarly, the communications links that are able to be established and maintained by the single antenna platform may be implemented via various spatial channels which may correspond to different wireless air interfaces and/or protocols that are utilized for satellite and other types of wireless communications, such as is described elsewhere in the present disclosure.

FIG. 1 illustrates an example scenario 100 in which communicative connections are established between multiple constellations of satellites and a multi-constellation satellite communicator or terminal 102 that is disposed on-board a vehicle 101 (which is also referred to interchangeably herein as a "mobile platform 101") while the vehicle 101 is in motion or in transit (and optionally, at other times). The established communicative connections may be utilized, for example, to deliver data payload and other data corresponding to on-board connectivity services that are provided on-board the vehicle 101 bi-directionally between the vehicle 101 and the satellite systems. The example vehicle or mobile platform 101 illustrated in FIG. 1 is depicted as an aircraft that is in-flight, although as previously noted, the concepts and techniques described herein may easily be applied to other types of vehicles which may be in motion or in transit.

The example scenario 100 of FIG. 1 depicts a first constellation of satellites including a first satellite 105a and a second satellite 105b that are both disposed in the same orbit 110, and a second constellation of satellites including a third satellite 112 that is disposed in a different orbit 118 further from the aircraft. (For clarity of illustration, other satellites included in the first and second constellations 110, 118 are not shown in FIG. 1). Each orbit 110, 118 may be a LEO, a GEO, a medium earth orbit (MEO), a highly elliptical orbit, a polar orbit, or any other type of orbit in which satellites may be disposed. Although FIG. 1 illustrates the first and second constellations of satellites as including only three satellites 105a, 105b, 112 disposed in two different orbits 110, 118, it is understood that the multiple constellations of satellites with which the multi-constellation satellite terminal 102 may communicatively connect may include any number of one or more satellites that simultaneously orbit the earth at any number of altitudes and speeds, in any number of one or more constellations.

The satellites 105a, 105b, and 112 may be communications satellites that relay information between the vehicle 101 (e.g., bi-directionally over communicative connections or links 108a, 108b, and 115 as discussed below) and one or more ground-based data and/or communications networks 120. Typically, the satellites 105a, 105b, and 112 may directly communicate with respective earth stations 122a, 122b, 125, e.g., via respective links 128a, 128b, 130. The earth stations 122a, 122b, 125 may be communicatively connected to the one or more ground networks 120, which may include one or more data and/or communications networks, such as private or proprietary networks, public internets, virtual private networks, dedicated access lines, plain ordinary telephone service (POTS) lines, Public Switched Telephone Network (PSTN) networks, cellular and/or mobile communications networks, IP networks, packet networks, computing cloud networks, wired and/or wireless ground-based networks, and/or other types of data and/or communications networks or combinations of networks. Where the network 120 comprises the Internet, data communications may take place over the network 120 via an Internet communication protocol, for example.

While only a single vehicle or mobile platform 101 is illustrated in FIG. 1, it is understood that the multiple constellations of satellites (e.g., that are using the orbits 110, 118, and/or other constellations) may be used to communicate with tens, hundreds, thousands, etc. of different vehicles or mobile platforms. Similarly, while only three satellites 105a, 105b and 112 in two different satellite constellations (e.g., as denoted by orbits 110 and 118) are illustrated in FIG. 1, it is appreciated that each constellation of satellites may respectively include tens, hundreds, or any number of satellites covering all or part of the earth. Further, the ground-based networks 120 may include tens, hundreds, or any number of different networks which may communicate with each other in known ways.

The multi-constellation satellite terminal 102 may include a single antenna platform or array via which the terminal 102 may establish communications links 108a and 108b with satellites 105a and 105b disposed in the same orbit 110, and via which the terminal 102 may simultaneously maintain and operate over some duration of time. Generally speaking, the single antenna platform or array of the multi-constellation satellite terminal 102 is an only component of the terminal 102 that is configured to propagate electromagnetic waves or signals from the terminal 102 toward satellites. That is, other than the single antenna platform, the multi-constellation satellite terminal 102 does not include any other antenna, antenna array, or antenna platform which is used during on-line operations of the terminal 102 to communicate with satellites, e.g., for the purposes of delivering data related to on-board connectivity services. (It is noted, though, that in failure scenarios, a spare antenna platform may be brought into service in lieu of the single antenna platform.)

At any rate, the single antenna platform or array of the multi-constellation satellite terminal 102 may simultaneously maintain communications links 108a, 108b so that links 108a and 108b are simultaneously operational, thereby allowing for soft handoffs between the satellites 105a and 105b, which advantageously may reduce or eliminate lagging or downtime of on-board connectivity services. In some scenarios, the links 108a, 108b may be simultaneously maintained by the multi-constellation satellite terminal 102 over a longer or greater interval of time than the interval of time utilized to perform a soft handoff to thereby provide greater bandwidth for use by the in-flight aircraft's on-board connectivity services. For example, each of the links 108a, 108b may be respectively maintained while its respective fidelity is sufficient (e.g., meets a minimum threshold of quality) to deliver respective, mutually exclusive data streams to thereby support on-board connectivity services for the vehicle 101.

Additionally or alternatively, the multi-constellation satellite terminal 102 may establish, via its lone antenna platform or array, communications links 108b and 115 respectively with satellites 105b and 112 that are respectively disposed in different orbits 110 and 118. The communications links 108b, 115 may be simultaneously operational and/or maintained, e.g., for soft handoff and/or for increased bandwidth purposes. For example, handing off the support for on-board connectivity services from the satellite 105b disposed in the orbit 110 to the satellite 112 disposed in the different orbit 118 may reduce or eliminate lagging or downtime of on-board connectivity services as compared with the lagging and/or downtime which may occur during handoff between two satellites that are both disposed in the same orbit 110. In another example, should the link 108b suffer from temporary degradation (e.g., due to ASI or some other reason related to the orbit 110), on-board connectivity services may nonetheless be seamlessly maintained via the link 115 corresponding to the orbit 118. In some situations, it may be desirable to maintain the communications link 115 corresponding to the other orbit 118 while performing a hard or soft handoff between two satellites 105b, 105a disposed in the same orbit 110, e.g., to maintain seamless connectivity. Indeed, to support soft handoffs in such situations, and/or for other purposes, the multi-constellation satellite terminal 102 may establish three communications links 108a, 108b, and 115 that are simultaneously maintained over some duration of time. It is noted that the communications links established by the multi-constellation satellite terminal 102 need not be limited to two or three simultaneously maintained and/or operational links, as shown in FIG. 1, but may include any number of communications links that are established and maintained using the set of resources provided by the lone antenna platform or array of the multi-constellation satellite terminal 102.

Figure 2:
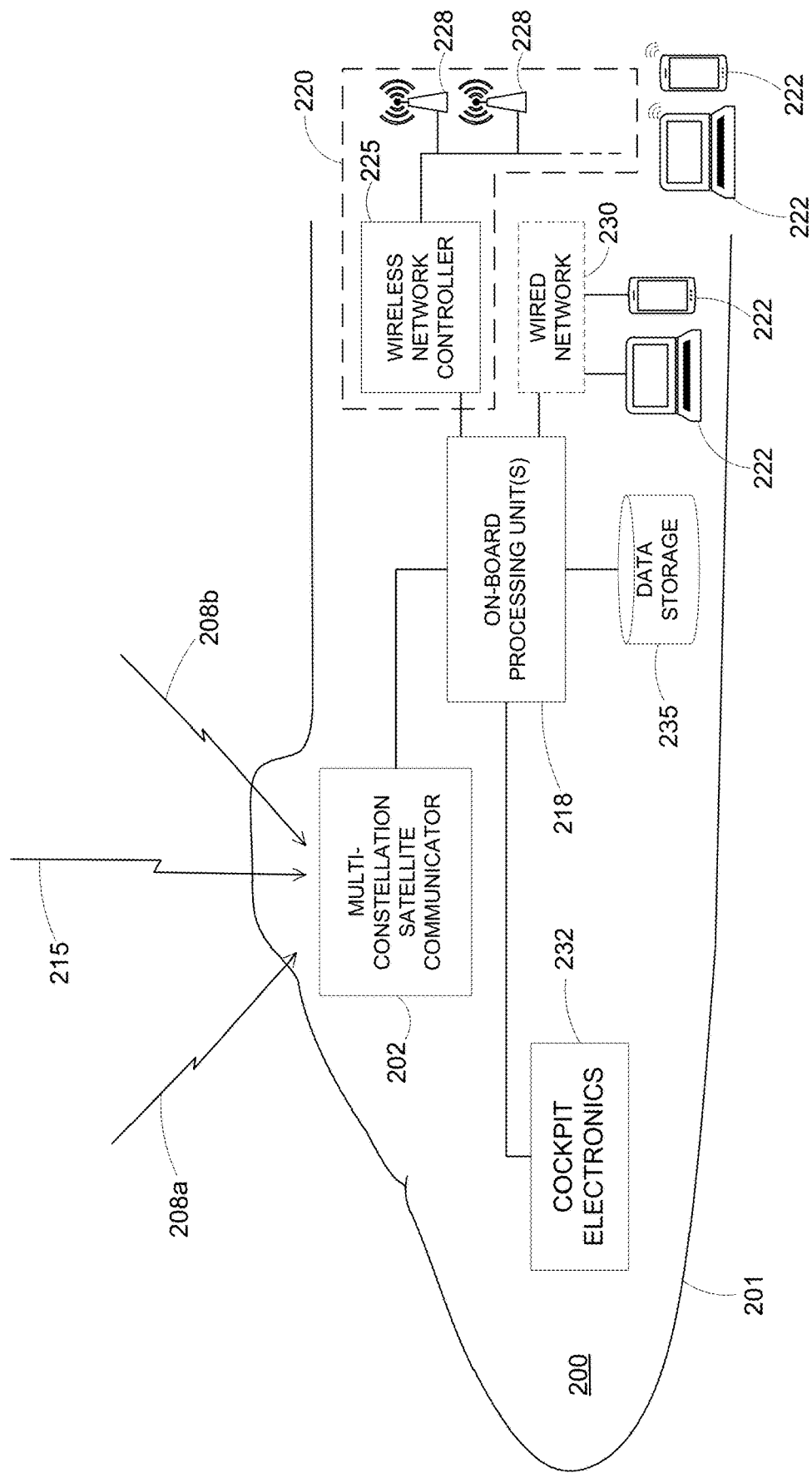
FIG. 2 is a high-level block diagram of an example system that is on-board a vehicle and configured to establish and maintain multiple, simultaneously operational communications links with multiple satellites which may be in same or different orbits, e.g., to support on-board connectivity services.

FIG. 2 illustrates an example on-board system 200 disposed in a vehicle 201, where the system 200 is configured to establish and maintain multiple, simultaneously operational communications links with multiple satellites which may be in same or different orbits, e.g., to support on-board connectivity services to passenger electronic devices (PEDs) on-board the vehicle 201. The system 200 may support the scenario 100 illustrated in FIG. 1, for example, and/or other scenarios. For ease of understanding, though, and not for limitation purposes, FIG. 2 is described herein with simultaneous reference to FIG. 1.

The on-board system 200 may include a multi-constellation satellite communicator or terminal 202 that may be particularly configured (e.g., as is described in more detail elsewhere in the present disclosure) to establish and simultaneously maintain and/or operate multiple communications links to multiple satellites (not shown in FIG. 2), where the multiple satellites may be included in the same or different satellite constellations, and where different satellite constellations may utilize different orbits. For example, the communication links 208a, 208b, and 215 shown in FIG. 2 may respectively correspond to the links 108a, 108b, and 115 shown in FIG. 1. In an embodiment, the links 208a, 208b, 215 may support respective, independent spatial channels, each of which the multi-constellation satellite communicator 202 may utilize to transmit an outgoing data stream to a respective satellite.

As illustrated in FIG. 2, the multi-constellation satellite communicator 202 may be communicatively connected to one or more on-board processing units, devices, or systems 218, which may be, in turn, communicatively connected to one or more on-board wireless networks 220 to which on-board PEDs 222 may be communicatively connected. Generally speaking, the on-board processing units 218 may manage delivery of data (e.g., data that is for consumption by passengers operating or interacting with the PEDs 222) to and from the on-board PEDs 222 from various components on-board the vehicle 201, such as from the multi-constellation satellite communicator 202, the on-board processing unit 218 itself, and/or other on-board components (not shown). As such, the on-board processing units 218 may be connected, in a wired manner, to a router or controller 225 of an on-board wireless network 220. The wireless network controller 225 may manage data routing and wireless connections (e.g., Wi-Fi, Bluetooth, and/or other types of wireless connections) with on-board PEDs 222 via various nodes, access points, or transceivers 228. Additionally or alternatively, in a similar manner, the one or more on-board processing units, devices, or systems 218 may be connected to one or more on-board wired networks 230 to which on-board PEDs 222 may be communicatively connected, e.g. via ports or jacks that are accessible to passengers who are on-board the vehicle 201.

As also illustrated in FIG. 2, the one or more on-board processing units, devices, or systems 218 may be communicatively connected to one or more on-board vehicle electronics systems 232 (which is depicted in the example system 200 of FIG. 2 as being cockpit electronics 232, as the vehicle 201 is depicted therein as an aircraft). Generally speaking, the on-board vehicle or cockpit electronics 232 may be configured to collect electronic information from various instruments that are on-board the vehicle 201. For example, when the aircraft 201 is in flight, the cockpit electronics 232 may collect current, detected, and/or predicted flight information such as altitude, attitude, aircraft position, air speed, vertical speed, and/or other aircraft or flight information, and may provide the collected information to the on-board processing unit(s) 218.

In some implementations, the one or more on-board processing unit(s) 218 may have read and/or write access to one or more on-board data storage entities 235. The one or more on-board data storage entities 235 may store various types of data corresponding to providing on-board connectivity services to on-board PEDs 222, such as account information, usage data, web pages, user interfaces, applications that may be installed onto PEDs 222, information identifying the devices 222, payment information (e.g., encrypted financial account information), digital rights management (DRM) keys, content that is transmitted to and/or received from the PEDs 222, content that is transmitted to and/or received from ground-based networks 120, and/or any other data that relates to on-board connectivity services and that is desired to be stored, at least temporarily, on-board the vehicle 201 of FIG. 2.

In an embodiment, each of the PEDs 222 may include a respective instance of a vehicle travel application (VTA) installed thereon (not shown in FIG. 2) and particularly configured to support on-board connectivity services while the device 222 is being transported by the vehicle 201, e.g., while the vehicle 201 is traveling en route between ports. For example, the vehicle travel application may be configured to operate as the on-board end of a data tunnel that is established with a ground communications station, such as one of the earth stations 122a, 122b, 125, and/or may be configured to operate as the on-board end of a data tunnel that is established with an application executing in a ground-based network 120. The vehicle travel application may provide a user interface at a PED 222 via which a passenger may access and interact with on-board connectivity services, e.g., via an account or as a guest. In an embodiment, the vehicle travel application may communicate with other applications that are installed on a particular device 222 (e.g., native terrestrial applications) so that the other applications may operate as desired (e.g., in a native manner) while the device 222 is being transported by the vehicle 201.

Figure 3:
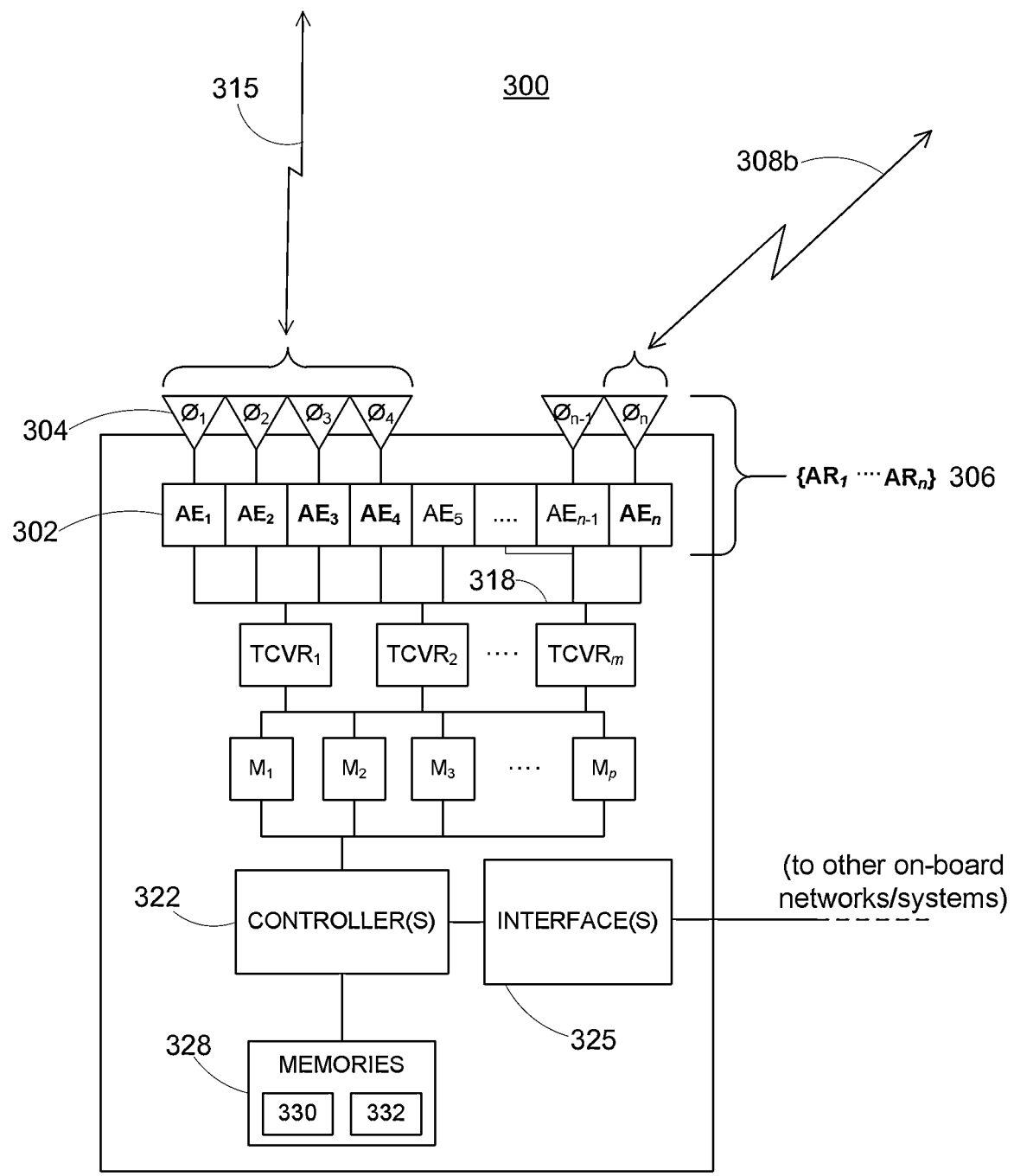
FIG. 3 is a block diagram of an embodiment of a multi-constellation satellite terminal or communicator.

FIG. 3 is a high-level block diagram of an embodiment of a multi-constellation satellite communicator or terminal 300 that is configured to support on-board connectivity services provided on-board a vehicle or mobile platform. The terminal 300 may be mounted on or otherwise disposed on-board a vehicle or mobile platform, such as the vehicle 101 of FIG. 1 or the vehicle 201 of FIG. 2. In an embodiment, the multi-constellation satellite terminal 300 may be utilized as the multi-constellation satellite communicator or terminal 102 depicted in FIG. 1, or as the multi-constellation satellite communicator or terminal 202 depicted in FIG. 2. However, it is understood that the multi-constellation communicator or terminal 300 may be implemented in systems other than the on-board system 200 of FIG. 2, and/or in scenarios other than the scenario 100 of FIG. 1. For ease of understanding, though, and not for limitation purposes, FIG. 3 is described herein with simultaneous reference to FIGS. 1 and 2.

As shown in FIG. 3, the multi-constellation satellite terminal 300 includes a lone, single, or sole (e.g., only one, and not more than one) antenna element array or platform 302 having multiple antenna elements 302 AE1-AEn which may include, in an example, n physical antennas that may be controlled to radiate and steer one or more beams of electromagnetic waves via respective phase controllers $\varnothing_1$-$\varnothing_n$ 304. For clarity, the term antenna elements ("AE") is understood to pertain to the antenna elements 302 without inclusion of phase controllers 304, while the term antenna resource or antenna resource platform ("AR") 306 is understood to include antenna resources AR1-ARn, each of which includes a respective antenna element 302 AE1-AEn and a respective phase shifter or controller 304 $\varnothing_1$-$\varnothing_n$, as denoted by the bracket denoting the antenna resources 306 in FIG. 3. For example, a first antenna resource AR1 may include AE1 operating in conjunction with phase shifter $\varnothing_1$, a second antenna resource AR2 may include AE2 operating in conjunction with phase shifter $\varnothing_2$, etc. It is noted that while the phase shifters $\varnothing_1$-$\varnothing_n$ illustrated in FIG. 3 are depicted as single phase shifters, each phase shifter may be a set of one or more phase shifters that are utilized by an antenna element, for example, the phase shifter $\varnothing_1$ may include one, two, or more phase shifters that are utilized by the antenna element AE1. Thus, for ease of discussion, the singular form "phase shifter" is used herein even though each illustrated phase shifter may include one or more independent phase shifters.

Further, as the antenna resource platform 306 is a lone, single, or sole antenna platform of the multi-constellation satellite terminal 300, the multi-constellation satellite terminal 300 does not include any other component, other than the antenna resource platform 306, that generates and propagates electromagnetic waves from the mobile communicator 300 and that is excited by electromagnetic waves that were generated and propagated by satellites to thereby communicate with satellites during normal, real-time operations. (It is noted, though, that if the single antenna resource platform 306 fails, a spare antenna platform may be brought into service in lieu of the single antenna resource platform 306. However, the spare antenna resource platform is not used in conjunction with the single antenna resource platform 306 during normal operations.)

At any rate, in an implementation, subsets of the plurality of antenna resources AR1-ARn of the antenna array or platform 302 may be dynamically allocated and re-allocated while the vehicle is in motion or in transit to simultaneously provide differently-sized spatial channels and/or different agilities or steering capabilities and thereby establish and simultaneously maintain (for at least various intervals of time) multiple links to multiple satellites, which may be satellites of different constellations. For example, at least one or more antenna resources AR1-ARn may be utilized to establish and maintain communications with satellites via links using the L, S, C, X, $K_u$, K, $K_a$, and/or any other frequency band that is utilized for communicating with satellites. To illustrate, in the example scenario shown in FIG. 3, antenna resources AR1-AR4 (e.g., AE1-AE4 operating in conjunction with phase shifters $\varnothing_1$-$\varnothing_4$) of the resource platform 306 are being utilized to support a communications link 315 with a GEO satellite via a first spatial channel, while antenna resource ARn (e.g., AEn operating in conjunction with $\varnothing_n$) of the platform 306 is being utilized to support a communications link 308b with an LEO satellite via a second spatial channel. Although not depicted in FIG. 3, other remaining antenna resources of the antenna resource platform 306 may be being utilized to support other communications links to other satellites (which may be disposed in the same or different orbits), may be idle, or may be being utilized to probe the suitability of other spatial channels to still other satellites which may be disposed in the same or different orbits.

Each of the antenna resources AR1 to ARn may be communicatively connected, e.g., via a physical or logical bus or other type of suitable connection 318, to one or more transceivers TCVR1-TCVRm, each of which may, in turn, be communicatively connected to one or more modems M1-Mp. Each of the transceivers TCVR1-TCVRm may support one or more air interfaces corresponding to the various spatial channels that are able to be utilized by the antenna resource platform 306 for multi-constellation satellite communications. Such air interfaces may be based on and/or include multiple access techniques such as FDMA (Frequency Division Multiple Access, TDMA (Time Division Multiple Access), CDMA (Code Division Multiple Access), SDMA (Space Domain Multiple Access), PDMA (Power Division Multiple Access), other variations thereon such as OFDM (Orthogonal Frequency-Division Multiplexing) and/or other variations, GMR (GEO-Mobile Radio Interface) DVB-S2x (Digital Video Broadcasting Satellite Second Generation), a proprietary air interface, an air interface developed by ETSI (European Telecommunications Standards Institute) or by another standardization organization, etc. Generally speaking, any type of air interface or spatial channel that is utilized for satellite communications technology may be established and supported by any number of the antenna resources AR1-ARn, the set of transceivers TCVR1-TCVRm, and the set of modems M1-Mp included in the multi-constellation satellite communicator or terminal 300.

In an embodiment, each transceiver TCVR1-TCVRm may be configured to support a different air interface corresponding to one or more respective spatial channels that are able to be utilized by one or more of the antenna resources AR1-ARn to communicate with multi-constellation satellites. For example, in the example scenario of FIG. 3, TCVR1 and a particular modem M1 may support a first air interface corresponding to the first spatial channel utilized by AR1-AR4, whereas TCVR2 and a different modem M2 may support a second, different air interface corresponding to the second spatial channel utilized by ARn. In an alternate arrangement, a single, flexible modem M3 may support both TCVR1 and TCVR2 and their respective air interfaces. The first spatial channel and first air interface may correspond to a satellite disposed in a first orbit, and the second spatial channel in the second air may correspond to a satellite disposed in a second, different orbit. In other scenarios, a first spatial channel and a second spatial channel utilized by the antenna resource platform 306 may correspond respectively to a first satellite and a second satellite, both of which are disposed in the same orbit and utilize a same or common air interface.

In an embodiment, the terminal 300 includes only one transceiver TCVR, where the single transceiver TCVR is configured to dynamically adapt to requirements of air interfaces corresponding to the spatial channel(s) that are in use and/or that are able to be in use, which may include same and/or different air interfaces. For example, in the scenario illustrated in FIG. 3, a single transceiver TCVR may service signals that are sent/received using a first air interface via the first spatial channel utilized by antenna resources AR1-AR4 and may also (in some cases, simultaneously over an interval of time) service signals that are sent/received using a second, different air interface via the second spatial channel utilized by antenna resource ARn. One or more modems M1-Mp may be configured to modulate and demodulate signals that are sent/received via the single transceiver TCVR.

Generally speaking, the multi-constellation satellite communicator 300 of FIG. 3 may include any number n of one or more antenna elements AE1 to AEn, any number m of one or more transceivers TCVR1 to TCVRm, and any number p of one or more modems M1-Mp that are collectively configured to support any desired number of different wireless satellite communications air interface technologies that are used to communicate via various spatial channels. Further, although each of the one or more transceivers TCVR1 to TCVRm and each of the one or more modems M1-Mp are depicted in FIG. 3 as being separate components of the multi-constellation satellite communicator 300, this is only one of many possible embodiments. For example, a single, integral transceiver component may support more than one air interface, a single, integral modem component may support more than one modulation scheme, a transceiver and a modem may be implemented by a single, integral component, etc.

Although in FIG. 3 the two communicative links 315 and 308b are established using antenna resources AR1-AR4 and ARn respectively, more than one communicative link may be established utilizing a same set of antenna resources. For example the antenna resources AR1-AR4 may be used to establish and simultaneously maintain both of the communicative links 315 and 308b of FIG. 3 over an interval of time. In preferred embodiments, the entirety of antenna resources AR1-ARn may be used to establish the communicative links 315 and 308b of FIG. 3 or any number of communicative links.

The multi-constellation satellite communicator embodiment 300 of FIG. 3 may include one or more controllers 322 that include, for example, one or more central processing units (CPUs) or processors. The one or more controllers 322 may be communicatively connected to one or more interfaces 325 of the multi-constellation satellite communicator 300 that, in turn, may be communicatively connected to one or more other devices, systems, and/or networks that are on-board the vehicle, such as the on-board processing unit(s) 218, wireless network(s) 220, wired network(s) 230, the vehicle electronic system(s) 232, and/or other on-board devices, systems, and/or networks.

Additionally, the one or more controllers 322 may be communicatively connected to one or more memories 328 of the multi-constellation satellite communicator 300. The one or more memories 328 may include volatile memory and/or non-volatile memory, and typically may comprise one or more non-transitory, tangible computer readable storage media such as random access memory (RAM), read only memory (ROM), FLASH memory, a biological memory, a hard disk drive, a digital versatile disk (DVD) drive, etc.

The one or more memories 328 may store thereon computer-readable instructions 330 that are executable by one or more controller(s) 322 to control or command the one or more transceivers TCVR1 to TCVRm to operate to support multi-constellation satellite communications, e.g., while the vehicle is in motion or in transit. Generally speaking, the computer-readable instructions 330, when executed by the one or more controllers 322, may receive and/or obtain information that is indicative of current or predicted conditions which may affect communications between the vehicle on which the multi-constellation satellite communicator 300 is disposed and various satellites (some of which may be disposed in a same or common orbit, and/or some of which may be disposed in different orbits).

For example, the obtained information may include information that is indicative of current or predicted conditions pertaining or corresponding to various spatial channels to the various satellites, such as the current or predicted network availability of respective satellite networks and/or constellations, current or predicted availabilities and/or trajectories of the various satellites themselves, respective current or predicted characteristics of the various spatial channels (e.g., traffic characteristics, bandwidth, usability, quality of service, channel data load, etc.), and/or other current or predicted conditions of other aspects corresponding to the various satellite communications networks. The obtained information may additionally or alternatively include, for example, information that is indicative of one or more current or predicted, future conditions of the vehicle or mobile platform, e.g., a current or predicted location of the vehicle, a current or predicted travel direction, a current or predicted speed, current or predicted angles of observation, and/or a current or predicted trajectory of the vehicle, etc. Still further, the obtained information may include information that is indicative of current or future weather and other environmental conditions or factors, and/or that is indicative of any other current or predicted conditions which may affect communications between the vehicle and the various satellites. Typically, such conditions may be dynamic; however, some conditions may be relatively static (such as when a particular satellite is scheduled for maintenance or otherwise not mechanically operational). As stated above, the conditions may be current conditions such as a current satellite location or current weather condition, or predicted conditions such as a future location of a satellite or future planned outage of a satellite. For simplification and clarity, the term "conditions" is understood to encompass both current and predicted conditions of any condition pertaining or corresponding to any satellite, satellite communicator or terminal, vehicle, spatial channel, and/or any other relevant component or aspect for operation of a multi-constellation satellite terminal. The information that is indicative of conditions may be received and/or obtained by the one or more controllers 322 via the one or more network interfaces 325 and/or via the one or more modems M1-Mp, for example.

At any rate, based upon the obtained information that is indicative of the conditions, the controller(s) 322 may determine or select a particular satellite constellation or network and spatial channel included therein via which a link to a target satellite (e.g., a target signal source) is to be established and maintained for use in supporting on-board connectivity services, e.g., to transmit and receive data related to on-board connectivity services (e.g., data payload, signaling data, address data, etc.) between the target satellite and the vehicle. The controller(s) 322 may indicate the selected spatial channel to one or more of the transceivers TCVR1-TCVRm, which may command, instruct, and/or utilize one or more resources of the antenna resource platform 306 to acquire and track the target signal source or satellite, e.g. by utilizing and steering some number of the antenna resources AR1-ARn to support an spatial channel size and/or a level of agility that is suitable for the target signal source or satellite. Typically, the spatial channel size and/or the level of agility that is suitable to communicate with a target satellite is based on, for example, a distance of the target satellite from the vehicle, an orientation of the target satellite with respect to the vehicle, an altitude of a target satellite, a location of the satellite, a location of the vehicle, and/or other factors, which may be included in the information obtained by the controller 322.

In an embodiment, the one or more memories 328 may store selection factors 332 that may be used by the controller(s) 322 to select spatial channels to target satellites. The selection factors 332 may include relatively static information, such as respective satellite maps for each constellation of satellites, respective minimum spatial channel size and/or respective ranges of spatial channel size that are required and/or desired to communicate with satellites of different constellations, respective agilities and/or steering capabilities that are required and/or desired to communicate with satellites of different constellations, tolerance thresholds related to various characteristics of quality of service and/or combinations thereof, respective priorities corresponding to respective constellations to which the communicator 300 may communicatively connect, respective priorities corresponding to respective combinations of various conditions which may affect communications between the vehicle and various satellites, and the like. Typically, the relatively static information included in the selection factors 332 may be loaded or stored into the memories 328 a priori, such as when the vehicle is at a port or otherwise not in transit. In some situations, at least some of the relatively static information and/or updates thereto may be downloaded into the memories 328 while the vehicle is in transit.

The selection factors 332 may include relatively dynamic information that is more frequently updated as compared to the frequency of updates to the relatively static information, as the relatively dynamic information generally reflects or is indicative of current or predicted statuses of dynamic conditions and/or components. For example, the relatively dynamic information included in the selection factors 332 may include indications of which subsets of antenna resources AR1-ARn and corresponding spatial channels are active or currently being used to support on-board connectivity services, which subsets of antenna resources AR1-ARn are currently being used to probe other spatial channels, which subsets of antenna resources AR1-ARn are currently idle; information indicative of one or more current or predicted conditions of the vehicle, information indicative of one or more current or predicted conditions of in-use and/or available spatial channels, and/or other information that is indicative of current or predicted conditions that is received and/or obtained by the one or more controllers 322, such as described elsewhere within the present disclosure.

Upon the commanded/instructed transceiver(s) acquiring the target signal source via the selected spatial channel and establishing a communications link thereon via respective antenna resources of the antenna resource platform 306, the mobile communicator 300 may utilize the communications link to send and receive data related to on-board connectivity services to and from the target satellite by utilizing the air interface corresponding to the selected spatial channel.

The computer-readable instructions 330 may be further executable to cause the one or more controllers 322 to monitor the conditions that may affect connectivity with the target satellite and other candidate satellites, e.g., by continuing to receive and/or otherwise obtain information that is indicative of updates to the conditions. At least some of the information indicative of updated conditions may be received and/or obtained via the network interface(s) 325. Additionally or alternatively, at least some of the information indicative of updated conditions may be received and/or obtain via at least some of the transceivers TCVR1-TCVRm and at least some of the modems M1-Mp, e.g., as a result of the probing of other spatial channels, and/or based on characteristics of currently in-use spatial channels. Based on the updated condition information, the controller(s) 322 may determine that an additional or alternate link to a different satellite via a different spatial channel is to be established to support on-board connectivity services, and may instruct the transceivers TCVR1-TCVRm and/or the antenna resource platform 306 accordingly. As discussed above, the different satellite may or may not be in the same constellation as the target satellite to which a link has already been established via the antenna resource platform 306. Further, in some situations, an additional link and an established link may be simultaneously maintained by the multi-constellation satellite terminal 300 to support on-board connectivity services, e.g., in a manner such as is discussed elsewhere herein. Still further, in some embodiments, the computer-readable instructions 330 may be additionally or alternatively executable to perform at least a portion of the one or more of the methods described elsewhere herein.

It is noted that the multi-constellation satellite terminal 300 depicted in FIG. 3 is only one example embodiment. Other embodiments of the multi-constellation satellite terminal may have more or fewer components than shown in FIG. 3, have one or more combined components, or have a different configuration or arrangement of the components. Moreover, the various components shown in FIG. 3, may be implemented by hardware, by firmware, by a processor executing software instructions, or by a combination of hardware and/or firmware and a processor executing software instructions, including one or more signal processing and/or application specific integrated circuits.

Figure 4:
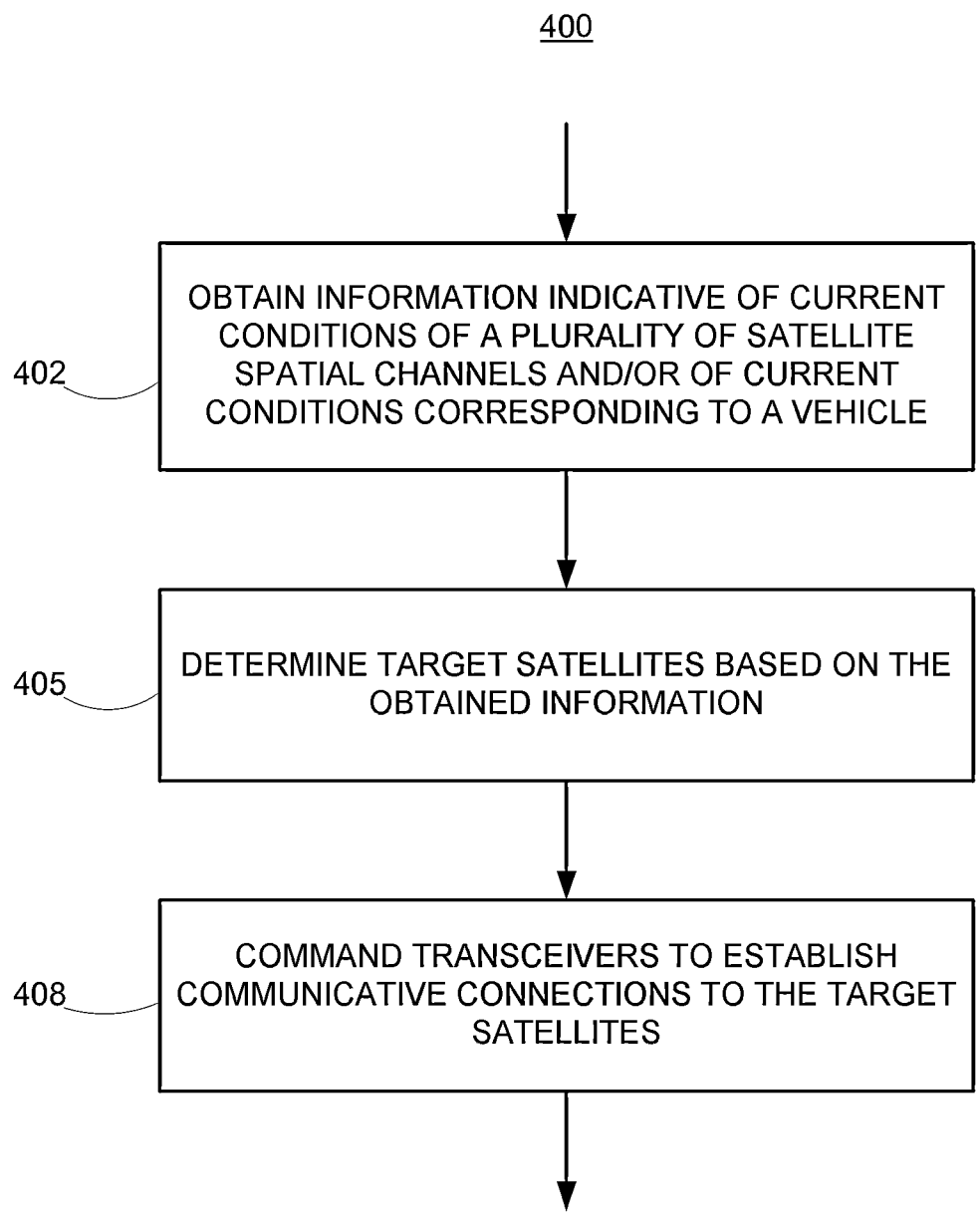
FIG. 4 is a flow diagram of an example method for establishing communications between a vehicle or mobile platform and multiple satellites, e.g., to support on-board connectivity services.

FIG. 4 illustrates a flow diagram of an example method 400 for establishing communications between a vehicle/mobile platform and multiple satellites, e.g., to support on-board connectivity services that are provided to personal electronic devices (PEDs) on-board the vehicle or mobile platform. At least a portion of the method 400 may be performed by a multi-constellation satellite terminal or communicator that is mounted on or otherwise disposed on-board the vehicle or mobile platform. In an embodiment, the multi-constellation satellite communicator or terminal 300 of FIG. 3 performs at least a portion of the method 400 of FIG. 4, although some or all of the method 400 may be performed by a communicator, device, or system other than the multi-constellation satellite communicator or terminal 300. The method 400 of FIG. 4 is described below with simultaneous reference to the example scenario 100 of FIG. 1, the example on-board system 200 of FIG. 2, and/or the example communicator or terminal 300 of FIG. 3, however, this is only for ease of discussion, and is understood to be non-limiting.

At a block 402, the method 400 may include obtaining information that is indicative of one or more current or predicted conditions corresponding to the vehicle or mobile platform and/or information that is indicative of one or more current or predicted conditions corresponding to a plurality of spatial channels which may be utilized to communicate data between the vehicle and the multiple satellites, some of which may be disposed in a common or same orbit, and/or some of which may be disposed in different orbits or constellations. The vehicle or mobile platform may be in-transit or otherwise in motion, for example, and the data may include data payload, signaling data, address data, and/or other data related to on-board connectivity services that are provided on-board the vehicle/mobile platform. In an embodiment, the information may be obtained at a controller of a mobile communicator that is disposed at (e.g., mounted on) the vehicle or mobile platform, such as the one or more of the controllers 322 of the communicator 300. For example, at least a portion of the information indicative of current or predicted conditions may be obtained by the controller of the mobile communicator from one or more other components of the mobile communicator, such as from a local memory of mobile communicator (e.g., the one or more memories 328 included in the terminal 300, and/or other local memories), from one or more transceivers and/or one or more modems of the mobile communicator, where the transceivers and/or modems are utilized to communicate with the multiple satellites (e.g., one or more of the transceivers TCVR1 to TCVRm and/or one or more of the modems M1-Mp of the communicator 300, and/or other transceivers and/or modems), etc. Additionally or alternatively, at least a portion of the information indicative of current or predicted conditions may be obtained by the controller of the mobile communicator from one or more other devices, systems, and/or networks that are on-board the vehicle (e.g., the on-board processing unit(s) 218, wireless network(s) 220, wired network(s) 230, the vehicle electronic system(s) 232, the data storage entities 235 depicted in FIG. 2, and/or other on-board devices, systems, and/or networks) and with which the mobile communicator may be communicatively connected via one or more network interfaces of the mobile communicator (e.g., one or more of the interface(s) 325 of the terminal 300, and/or other interfaces). In some embodiments, at least a portion of the information indicative of current or predicted conditions may be determined by the controller of the mobile communicator based on information received from the one or more other on-board devices, networks, and/or systems.

The obtained information may include, for example, information that is indicative of current or predicted network availabilities of various satellite networks and/or constellations, current or predicted availabilities and/or trajectories of various satellites included in the networks/constellations, current or predicted characteristics of various spatial channels of the various satellite networks and/or constellations (e.g., traffic characteristics, bandwidth, usability, quality of service, etc.), and/or other current or predicted conditions of other parts of the various satellite communications networks, and/or of the various satellite locations networks as a whole. Further, the obtained information may additionally or alternatively include, for example, information that is indicative of current or predicted conditions of the vehicle or mobile platform, e.g., a current or predicted location of the vehicle, a current or predicted travel direction, speed, and/or trajectory of the vehicle, etc. Still further, the obtained information may include information that is indicative of current or predicted weather and other environmental conditions or factors, and/or information that is indicative of any other conditions which may affect communications between the vehicle and the multiple satellites. Typically, such conditions may be dynamic; however, some conditions may be relatively static (such as when a particular satellite is scheduled for maintenance or otherwise not mechanically operational).

At a block 405, the method 400 may include determining, identifying, or selecting, based on the obtained information, a plurality of target satellites, from the multiple satellites, to which communications are desired to be established. For example, the controller of the mobile communicator may determine, identify, or select the plurality of target satellites based on the obtained information. The plurality of target satellites may include two or more satellites that are disposed in a same or common orbit (e.g., that are parts of a same satellite constellation), and/or the plurality of target satellites may include two or more satellites that are disposed in different orbits (e.g., that are respectively included in different satellite constellations, such as GEO constellations, LEO constellations, MEO constellations, constellations that utilize highly elliptical orbits, constellations that utilize polar orbits, etc.). The determination, identification, or selection of the plurality of target satellites may be additionally based on one or more selection factors that are accessible to the mobile communicator (e.g., by receipt or notification, and/or by access, e.g., in manners such as described above). For example, the selection factors may include one or more of the selection factors 332 described above with respect to FIG. 3, and/or may include other selection factors relating to relatively static and/or relatively dynamic conditions or information corresponding to the vehicle, to available and/or in-use spatial channels, to satellites that are respectively included in respective, different satellite constellations, and/or to other conditions that may affect communicative connections between the vehicle and various satellites.

At a block 408, the method 400 may include commanding or instructing one or more transceivers to establish a respective communicative connection with each satellite included in the plurality of target satellites via a respective subset of antenna resources provided by an antenna platform. For example, the controller of the mobile communicator (e.g., the controller(s) 322 of the communicator 300) may command or instruct one or more transceivers of the mobile communicator (e.g., one or more of the transceivers TCVR1-TCVRm of the mobile communicator 300) to establish the respective communicative connections using respective subsets of the antenna resources provided by an antenna platform or array of the mobile communicator (e.g., respective subsets of the antenna resources AR1-ARn of the antenna resource platform 306 of the mobile communicator 300). The respective subsets of antenna resources may be mutually exclusive subsets or portions of an entirety of antenna resources provided by the antenna platform or array, in some implementations. Further, each subset of antenna resources may be used to generate a respective spatial channel of a particular size and/or to provide a respective agility that is required or optimally desired to be able to support the tracking of a corresponding target satellite.

In an embodiment, the antenna platform of the mobile communicator may be an antenna array (e.g., a phased array antenna) that is an only component of the mobile communicator that is configured to propagate electromagnetic waves or signals that are directed towards and/or intended to be received by satellites. Each communicative connection with each target satellite may be established via the antenna platform using a respective spatial channel and corresponding air interface, where the air interfaces corresponding to the plurality of target satellites may be based on different access techniques or communications technologies, such as previously discussed.

Upon execution and completion, by the one or more transceivers, of the command or instruction, communicative connectivity between the mobile communicator and the plurality of target satellites may thereby be established.

In an embodiment (not shown in FIG. 4), the method 400 may include establishing communicative connectivity between two of the plurality of target satellites and the mobile communicator via the antenna array in a generally sequential manner (not shown in FIG. 4). For example, the method 400 may include establishing, at a first time and by using a first portion of resources provided by the antenna array, a first communicative connection between the mobile communicator and a first target satellite. While the first communicative connection with the first target satellite is in-use, e.g., for delivery of data corresponding to on-board connectivity services, updated information indicative of current or predicted conditions and/or changed conditions may be received or otherwise obtained, and a second target satellite may be determined based on the updated information. As such, the method 400 may further include establishing, at a second time and by using a second portion of resources provided by the antenna array, a second communicative connection between the mobile communicator and the second target satellite. The first portion and second portion of antenna resources may be mutually exclusive portions of the antenna array, for example, and the first communicative connection with the first target satellite and the second communicative connection with the second target satellite may be simultaneously maintained by the antenna array over some interval of time for soft handoff purposes, e.g., so that duplicates of the data payload may be simultaneously delivered via both communicative connections until the soft handoff has been completed. The method 400 may further include switching the established communicative connectivity of the mobile communicator from the first satellite to the second satellite.

In an embodiment (also not shown in FIG. 4), the method 400 may include simultaneously maintaining, via the antenna array, respective communicative connections between the two or more of the plurality of satellites and the mobile communicator over a lengthier interval of time than the time needed to perform a soft handoff, e.g., to provide additional band-width via which data associated with on-board connectivity services may be delivered. For example, in this embodiment, different, mutually exclusive portions of the data payload may be simultaneously delivered via the different communicative connections that are being simultaneously maintained.

It is noted that although the novel and inventive techniques, systems, devices, and/or methods described herein relate to delivering data corresponding to on-board connectivity services that are provided to Personal Electronic Devices (PEDs) on-board a vehicle, the novel and inventive techniques, systems, devices, and/or methods described herein may be easily applied to delivering other types of data onto and off of a vehicle. For example, communications between cockpit electronics systems 232 and aircraft ground control systems may utilize any portions of any of the techniques described herein. In another example, communications between on-board processing units 218 and ground communication systems for purposes other than providing on-board connectivity may utilize any portions of any of the techniques described herein.

Moreover, any number or all of the foregoing systems and devices may include additional, less, or alternate functionality, including that discussed herein. Any number of all of the computer-implemented methods may include additional, less, or alternate actions, including those discussed herein, and may be implemented via one or more local or remote processors and/or transceivers, and/or via computer-executable instructions stored on non-transitory, computer-readable media or medium.

The processors, transceivers, mobile devices, terminals, processing units, servers, data storage servers, heuristic servers, transaction servers, and/or other computing devices and/or systems discussed herein may communicate with each via wireless communication networks and/or wired electronic communication networks. For instance, the communication between computing devices may be wireless communication or data transmission over one or more radio links, or wireless or digital communication channels.

Customers may opt into a program that allows them to share personal electronic device (PED) and/or customer information, with their permission or affirmative consent, with a service provider, e.g., of on-board connectivity services. In return, the service provider may provide the functionality discussed herein, including security, fraud, or other monitoring, and generate recommendations to the customer and/or generate alerts for the customers in response to abnormal activity being detected.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of one or more operations of the method may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of one or more operations of the method may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may implement numerous alternate embodiments, using either current technology or technology developed after the filing date of this application, which would still fall within the scope of the claims. By way of example, and not limitation, the disclosure herein contemplates at least the following aspects:

1. A mobile communicator, mounted on a mobile platform, for communicating with multiple constellations of satellites, where the mobile communicator comprises a phased array antenna that is (i) configured to propagate electromagnetic signals from the mobile communicator towards satellites, and (ii) dynamically adaptable to maintain simultaneous communicative connections to multiple constellations of satellites that are disposed in different orbits; one or more transceivers configured to communicate data that is to be delivered between the mobile platform and a plurality of satellites included in the multiple constellations of satellites; and a controller executing computer-executable instructions stored on one or more tangible-non-transitory memories to: obtain information indicative of one or more conditions corresponding to a plurality of spatial channels associated with the plurality of satellites and/or corresponding to the mobile platform; determine, based on the obtained information, one or more target satellites included in the plurality of satellites; and command the one or more transceivers to utilize the antenna array to establish a respective communicative connection with each target satellite included in the one or more target satellites via a respective spatial channel of the each target satellite.

2. The mobile communicator of the previous aspect, wherein the obtained information indicative of one or more conditions corresponding to a plurality of spatial channels includes information indicative of one or more current conditions, the one or more current conditions including at least one of: a current satellite location, a current mobile platform location, a current weather condition, or another current condition corresponding to at least one of: the mobile communicator, one or more satellites, or the plurality of spatial channels.

3. The mobile communicator of any one of the previous aspects, wherein the obtained information indicative of one or more conditions corresponding to a plurality of spatial channels includes information indicative of one or more predicted conditions, the one or more predicted conditions including at least one of: a predicted satellite location, a predicted mobile communicator location, a predicted weather condition, or another predicted condition corresponding to at least one of: the mobile communicator, one or more satellites, or the plurality of spatial channels.

4. The mobile communicator of any one of the previous aspects wherein the multiple constellations of satellites includes at least two of: a constellation of satellites disposed in a geostationary orbit (GEO), a constellation of satellites disposed in a low earth orbit (LEO), a constellation of satellites disposed in a medium earth orbit (MEO), or a constellation of satellites disposed in a highly elliptical polar orbit.

5. The mobile communicator of any one of the previous aspects, wherein: the one or more target satellites includes a GEO satellite included in the constellation of GEO satellites; and the one or more transceivers, responsive to the command of the controller: utilizes at least a portion of a plurality antenna resources provided by the antenna array to support the respective spatial channel of the GEO satellite, and upon establishment of the respective communicative connection between the mobile communicator and the GEO satellite, utilizes a particular air interface corresponding to the respective spatial channel of the GEO satellite to communicate at least a portion of the data to the GEO target satellite.

6. The mobile communicator of any one of the previous aspects, wherein: the one or more target satellites includes an LEO satellite included in the constellation of LEO satellites; and the one or more transceivers, responsive to the command of the controller: utilizes at least a portion of a plurality antenna resources provided by the antenna array to support the respective spatial channel of the LEO satellite and track a movement of the LEO satellite; and upon establishment of the respective communicative connection between the mobile communicator and the LEO satellite, utilizes a particular air interface corresponding to the respective spatial channel of the LEO satellite to communicate at least a portion of the data to the LEO target satellite.

7. The mobile communicator of any one of the previous aspects, wherein the one or more transceivers includes only one transceiver, and the only one transceiver, responsive to the command of the controller, utilizes a particular air interface to communicate with a first target satellite included in the one or more target satellites via the respective spatial channel corresponding to the first target satellite, and adapts the particular air interface to communicate with a second target satellite included in the one or more target satellites via the respective spatial channel corresponding to the second target satellite.

8. The mobile communicator of any one of the previous aspects, wherein the first target satellite and the second target satellite are respectively disposed in different orbits.

9. The mobile communicator of any one of the previous aspects, wherein the one or more target satellites include a plurality of target satellites respectively disposed in different orbits; and the controller further commands the one or more transceivers to simultaneously maintain, across an interval of time, the respective communicative connections with the plurality of target satellites respectively disposed in different orbits.

10. The mobile communicator of any one of the previous aspects, wherein: at least a first portion of a plurality of resources of the phased array antenna is adapted to support the respective communicative connection with a first target satellite included in the plurality of target satellites; and at least a second portion of the plurality of resources of the phased array antenna is adapted to support the respective communicative connection with a second target satellite included in the plurality of target satellites.

11. The mobile communicator of any one of the previous aspects, wherein the at least a second portion of the plurality of resources of the phased array antenna comprises all of the plurality of resources of the phased array antenna.

12. The mobile communicator of any one of the previous aspects, wherein: a first transceiver of the one or more transceivers utilizes a first air interface corresponding to the respective spatial channel of the first target satellite to communicate, during the interval of time, a first portion of the data to the first target satellite via the respective communicative connection with the first target satellite; and a second transceiver of the one or more transceivers utilizes a second air interface that corresponds to the second target satellite and that is different than the first air interface to communicate, during the interval of time, a second portion of the data to the second target satellite via the respective communicative connection with the second target satellite.

13. The mobile communicator of any one of the previous aspects, wherein at least a portion of the data that is to be delivered between the mobile platform and the plurality of satellites includes data utilized by an on-board connectivity service that is provided to one or more Personal Electronic Devices (PEDs) on-board the mobile platform, and wherein the mobile communicator further comprises one or more network interfaces communicatively connecting the mobile communicator with the one or more PEDs.

14. A method of communicating with multiple constellations of satellites, the method comprising: obtaining, at a controller of a mobile communicator mounted on a mobile platform, information indicative of one or more conditions corresponding to a plurality of spatial channels associated with multiple constellations of satellites disposed in different orbits and/or corresponding to the mobile platform; determining, by the controller and based on the obtained information, a plurality of target satellites included in the multiple constellations of satellites; commanding, by the controller, one or more transceivers of the mobile communicator to establish, via an antenna array of the mobile communicator, a respective communicative connection with each target satellite included in the plurality of target satellites via a respective spatial channel of the each target satellite and to utilize a respective air interface corresponding to the respective spatial channel of the each target satellite, the antenna array configured to propagate electromagnetic signals from the mobile communicator towards satellites and to maintain simultaneous communicative connections to the multiple constellations of satellites disposed in the different orbits, thereby establishing communicative connectivity between the mobile communicator and the plurality of target satellites via the antenna array.

15. The method of the previous aspect, wherein: wherein obtaining, at the controller of the mobile communicator mounted on the mobile platform, the information indicative of one or more conditions comprises obtaining information indicative of one or more current conditions, the one or more current conditions including at least one of: a current satellite location, a current mobile platform location, a current weather condition, or another current condition corresponding to at least one of: the mobile platform, one or more satellites, or the plurality of spatial channels.

16. The method of any one of aspects 14-15, wherein obtaining, at the controller of the mobile communicator mounted on the mobile platform, information indicative of one or more conditions comprises obtaining information indicative of one or more predicted conditions, the one or more predicted conditions including at least one of: a predicted satellite location, a predicted mobile platform location, a predicted weather condition, or another predicted condition corresponding to at least one of: the mobile platform, one or more satellites, or the plurality of spatial channels.

17. The method of any one of aspects 14-16, wherein establishing communicative connectivity between the mobile communicator and the plurality of target satellites comprises: at a first time, establishing, via at least a first portion of resources provided by the antenna array, a first communicative connection between the mobile communicator and a first target satellite included in the plurality of target satellites; and at a second time subsequent to the first time, establishing, via at least a second portion of resources provided by the antenna array, a second communicative connection between the mobile communicator and a second target satellite included in the plurality of target satellites; and wherein the method further comprises including switching the established communicative connectivity between the mobile and the plurality of target satellites from the first communicative connection to the second communicative connection.

18. The method of any one of aspects 14-17, further comprising, subsequent to establishing the first communicative connection between the mobile communicator and the first satellite at the first time, obtaining, at the controller of the mobile communicator, updated information indicative of one or more updated conditions corresponding to the plurality of spatial channels and/or corresponding to the mobile platform; and wherein determining the plurality of target satellites includes determining the second target satellite based on the updated information, and the second satellite is disposed in an orbit other than an orbit in which the first satellite is disposed.

19. The method of any one of aspects 14-18, further comprising simultaneously maintaining, via the antenna array, the respective communicative connections between the mobile communicator and two target satellites included in the plurality of target satellites over an interval of time.

20. The method of any one of aspects 14-19, wherein simultaneously maintaining, via the antenna array, the respective communicative connections between the mobile communicator and the two target satellites over the interval of time comprises maintaining, via the antenna array, the respective communicative connections between the mobile communicator and the two target satellites while a soft hand off is performed between the two target satellites.

21. The method of any one of aspects 14-20, wherein simultaneously maintaining, via the antenna array, the respective communicative connections between the mobile communicator and the two target satellites over the interval of time comprises sending a first portion of the data via the respective communicative connection maintained with one of the two target satellites over the interval of time while sending a second, mutually exclusive portion of the data payload via the respective communicative connection maintained the other one of the two target satellites over the interval of time.

22. The method of any one of aspects 14-21, wherein commanding the one or more transceivers of the mobile communicator to establish, via the antenna array of the mobile communicator, the respective communicative connection with the each target satellite via the respective spatial channel of the each target satellite comprises: commanding the one or more transceivers to adapt at least a first portion of antenna resources of the antenna array to establish a first spatial channel via which a first communicative connection with a first target satellite of the plurality of target satellites is established; and commanding the one or more transceivers to adapt at least a second portion of antenna resources to establish a second spatial channel via which a second communicative connection with a second target satellite of the plurality of target satellites is established, the first aperture and the second spatial channel being differently sized.

23. The method of any one of aspects 14-22, further comprising commanding the one or more transceivers to adapt at least a third portion of the antenna resources of the antenna array to establish a third spatial channel via which a third communicative connection with a third target satellite of the plurality of target satellites is established.

24. The method of any one of aspects 14-23, wherein utilizing the respective air interface of the respective spatial channel of the each target satellite comprises: utilizing a first air interface of a first spatial channel of a first target satellite included in the plurality of target satellites; and utilizing a second air interface of a second spatial channel of a second target satellite included in the plurality of target satellites, the second air interface being different than the first air interface.

25. The method of any one of aspects 14-24, wherein the plurality of target satellites located in different orbits includes at least two of: a satellite disposed in a geostationary orbit (GEO), a satellite disposed in a low earth orbit (LEO), a satellite disposed in a medium earth orbit (MEO), or a satellite disposed in a highly elliptical polar orbit.

26. The mobile communicator of any one of aspects 1-13, wherein the one or more conditions corresponding to the mobile platform include a current and/or a predicted geographic location of the mobile platform.

27. The mobile communicator of any one of aspects 1-13 and 26, wherein the one or more conditions corresponding to the plurality of spatial channels corresponding to the plurality of satellites comprises respective priorities of different spatial channels corresponding to respective satellites included in the plurality of satellites.

28. The method of any one of aspects 14-25, further comprising obtaining, at the controller, information indicative of a predicted location of the mobile platform; and wherein determining the plurality of target satellites is further based on the predicted location of the mobile platform.

29. The method of any one of aspects 14-25 and 28, wherein determining the plurality of target satellites based on the obtained information comprises determining the plurality of target satellites further based on respective priorities of at least some of the satellites included in the multiple constellations of satellites.

30. The mobile communicator of any one of aspects 1-13 and 26-27, wherein the phased array antenna is an only component of the mobile communicator that is configured to propagate electromagnetic signals from the mobile communicator towards satellites.

31. The mobile communicator of any one of aspects 1-13, 26-27, and 30, wherein the phased array antenna is a first phased array antenna, and the mobile communicator further comprises a second phased array antenna that is (i) configured to propagate electromagnetic signals from the mobile communicator towards satellites, and (ii) dynamically adaptable to maintain simultaneous communicative connections to the multiple constellations of satellites that are disposed in the different orbits.

32. The mobile communicator of any one of aspects 1-13, 26-27, and 30-31, wherein at least a first portion of a union of a plurality of antenna resources provided by the first antenna array and a plurality of resources provided by the second antenna array is utilized to support a communicative connection between the mobile communicator and a particular satellite included in the multiple constellations of satellites.

33. The mobile communicator of any one of aspects 1-13, 26-27, and 30-32, wherein: the particular satellite is a first satellite; the communicative connection to the first satellite is a first communicative connection; at least a second portion of the union of the plurality of antenna resources provided by the first antenna array and the plurality of resources provided by the second antenna array is utilized to support a second communicative connection between the mobile communicator and a second satellite included in the multiple constellations of satellites; and the first communicative connection and the second communicative connection are simultaneously maintained by the mobile communicator over a particular duration of time.

34. The mobile communicator of any one of aspects 1-13, 26-27, and 30-33, wherein the first satellite and the second satellite are disposed in different, respective orbits.

35. Any one of the previous aspects in combination with any other one of the previous aspects.

Thus, many modifications and variations may be made in the techniques, methods, systems, and structures described and illustrated herein without departing from the spirit and scope of the present claims. Accordingly, it should be understood that the methods, systems, devices and apparatuses, and systems described herein are illustrative only and are not limiting upon the scope of the claims.

What is claimed:

1. A method of communicating with multiple satellites, the method comprising:
   allocating, by a controller of a mobile communicator mounted on a mobile platform and based on one or more conditions corresponding to a plurality of spatial channels associated with multiple satellites, each subset of a plurality of subsets of antenna resources of a phased array antenna to a respective different satellite included in the multiple satellites;
   commanding, by the controller, one or more transceivers to establish simultaneous communicative connections to the different satellites via the allocated subsets of antenna resources;
   re-allocating, by the controller based on a detected change to at least one of the one or more conditions, at least one antenna resource included in the plurality of subsets of antenna resources of the phased array antenna to a respective another different satellite; and commanding, by the controller, the one or more transceivers to maintain the simultaneous communicative connections to the different satellites using the re-allocated at least one antenna resource.

2. The method of claim 1, wherein allocating the each subset of the plurality of subsets of antenna resources of the phased array antenna includes allocating mutually exclusive subsets of antenna resources of the phased array antenna.

3. The method of claim 1, wherein allocating the each subset of the plurality of subsets of antenna resources of the phased array antenna includes allocating a particular antenna resource to more than one subset of the plurality of subsets of the phased array antenna.

4. The method of claim 1, wherein re-allocating the at least one antenna resource of the phased array antenna to the respective another satellite includes re-allocating the at least one antenna resource of the phased array antenna exclusively to the respective another different satellite.

5. The method of claim 1, wherein re-allocating the at least one antenna resource of the phased array antenna includes re-allocating a mutually exclusive subset of antenna resources of the phased array antenna, the mutually exclusive subset of antenna resources including the at least one antenna resource.

6. The method of claim 1, further comprising:
probing, by one or more other antenna resources of the phased array antenna, the at least one of the one or more conditions;
determining, based on the probing of the at least one of the one or more conditions, a target spatial channel;
re-allocating, by the controller based on the determined target spatial channel, one or more of the antenna resources included in the plurality of subsets of antenna resources to establish a communicative connection with a satellite associated with the target spatial channel; and
commanding, by the controller, the one or more transceivers to establish a communicative connection to the satellite associated with the target spatial channel via the re-allocated one or more antenna resources corresponding to the target spatial channel.

7. The method of claim 6, further comprising commanding, by the controller, the one or more transceivers to perform a handoff between one of the simultaneously connected different satellites and the satellite associated with the target spatial channel.

8. The method of claim 1, wherein while the simultaneous communicative connections to the different satellites are maintained, the method further comprises:
allocating, by the controller, at least one other antenna resource of the phased array antenna to track a particular satellite included in the multiple satellites; and
commanding, by the controller, the one or more transceivers to track the particular satellite by using the allocated at least one other antenna resource.

9. The method of claim 1, wherein the multiple satellites includes at least two of:
a satellite in a constellation of satellites disposed in a geostationary orbit (GEO);
a satellite in a constellation of satellites disposed in a low earth orbit (LEO);
a satellite in a constellation of satellites disposed in a medium earth orbit (MEO); or
a satellite in a constellation of satellites disposed in a highly elliptical polar orbit.

10. The method of claim 1, further comprising transmitting, via the simultaneous communicative connections of the re-allocated at least one antenna resource, a data stream between the mobile communicator and the different satellites, wherein at least a portion of the data stream includes data that corresponds to an on-board connectivity service and that is to be provided to one or more Personal Electronic Devices (PEDs) on-board the mobile platform, and wherein the mobile communicator is communicatively connected with the one or more PEDs via one or more on-board networks.

11. A mobile communicator, mounted on a mobile platform, for communicating with multiple satellites, the mobile communicator comprising:
a phased array antenna that is configured to propagate electromagnetic signals from the mobile communicator towards satellites via a plurality of antenna resources;
one or more transceivers configured to communicate data that is to be delivered between the mobile platform and satellites; and
a controller executing computer-executable instructions stored on one or more tangible-non-transitory memories to:
allocate, based on one or more conditions corresponding to a plurality of spatial channels associated with multiple satellites, each subset of a plurality of subsets of antenna resources of the phased array antenna to a respective different satellite included in the multiple satellites;
command the one or more transceivers to establish simultaneous communicative connections to the different satellites via the allocated subsets of antenna resources;
re-allocate, based on a detected change to at least one of the one or more conditions, at least one antenna resource included in the plurality of subsets of antenna resources of the phased array antenna to a respective another different satellite; and
command the one or more transceivers to maintain the simultaneous communicative connections to the different satellites using the re-allocated at least one antenna resource.

12. The mobile communicator of claim 11, wherein the allocation of the each subset of the plurality of subsets of antenna resources of the phased array antenna includes one or more of: an allocation of mutually exclusive subsets of antenna resources of the phased array antenna, or an allocation of a particular antenna resource to more than one subset of the plurality of subsets of the phased array antenna.

13. The mobile communicator of claim 11, wherein the re-allocation of the at least one antenna resource of the phased array antenna to the respective another satellite includes: a re-allocation of the at least one antenna resource of the phased array antenna exclusively to the respective another different satellite, or a re-allocation of a mutually exclusive subset of antenna resources of the phased array antenna to the respective another satellite, the mutually exclusive subset of antenna resources including the at least one antenna resource.

14. The mobile communicator of claim 11, wherein the controller executes the computer-executable instructions further to:
probe, by one or more other antenna resources of the phase array antenna, the at least one of the one or more conditions;

determine, based on the probing of the at least one of the one or more conditions, a target spatial channel;

re-allocate, based on the determined target spatial channel, one or more of the antenna resources included in the plurality of subsets of antenna resources to establish a communicative connection with a satellite associated with the target spatial channel; and command the one or more transceivers to establish a communicative connection to the satellite associated with the target spatial channel via the re-allocated one or more antenna resources corresponding to the target spatial channel.

15. The mobile communicator of claim 14, wherein the controller executes the computer-executable instructions further to command the one or more transceivers to perform a handoff between one of the simultaneously connected different satellites and the satellite associated with the target spatial channel.

16. The mobile communicator of claim 14, wherein the probing of the at least one of the one or more conditions includes a probing of spatial channel conditions associated with satellites disposed in different orbits.

17. The mobile communicator of claim 11, wherein while the simultaneous communicative connections to the different satellites are maintained, the controller executes the computer-executable instructions further to:

allocate at least one other antenna resource of the phased-array antenna exclusively to track a particular satellite included in the multiple satellites; and command the one or more transceivers to exclusively track the particular satellite by using the allocated at least one other antenna resources.

18. The mobile communicator of claim 11, wherein the mobile platform comprises an aircraft.

19. The mobile communicator of claim 11, wherein the multiple satellites include at least two of:

a constellation of satellites disposed in a geostationary orbit (GEO);

a constellation of satellites disposed in a low earth orbit (LEO);

a constellation of satellites disposed in a medium earth orbit (MEO); or a constellation of satellites disposed in a highly elliptical polar orbit.

20. The mobile communicator of claim 11, wherein the controller executes the computer-executable instructions further to transmit, via the simultaneous communicative connections of the one or more re-allocated antenna resources, a data stream between the mobile communicator and the different satellites, wherein at least a portion of the data stream includes data that corresponds to an on-board connectivity service and that is to be provided to one or more Personal Electronic Devices (PEDs) on-board the mobile platform, and wherein the mobile communicator is communicatively connected with the one or more PEDs via one or more on-board networks.

* * * * *